Jan. 3, 1950     L. T. MART     2,493,633
DOUBLE-WALLED CONTAINER
Filed June 3, 1946
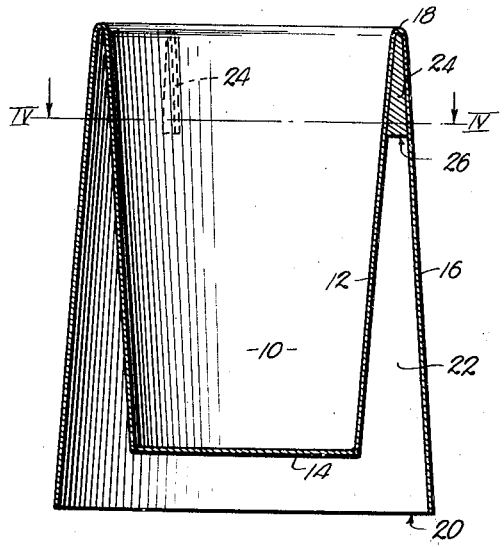
Fig. 1.
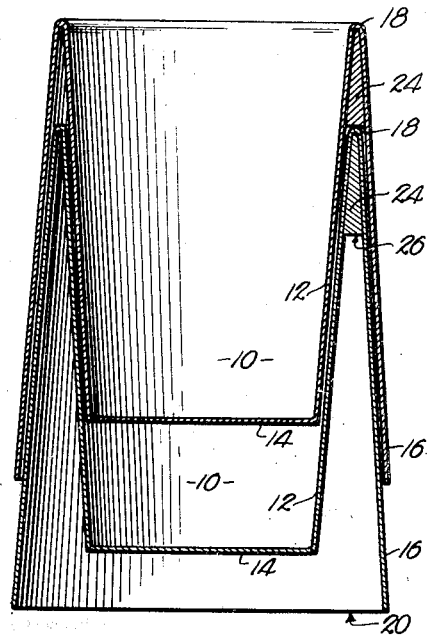
Fig. 3.
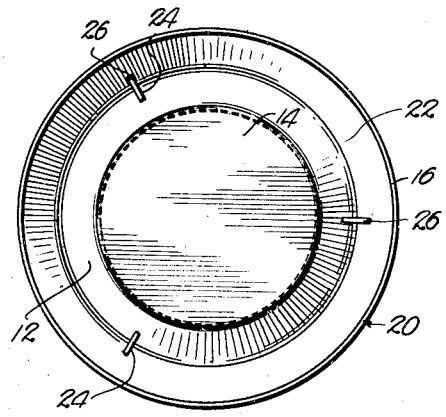
Fig. 2.
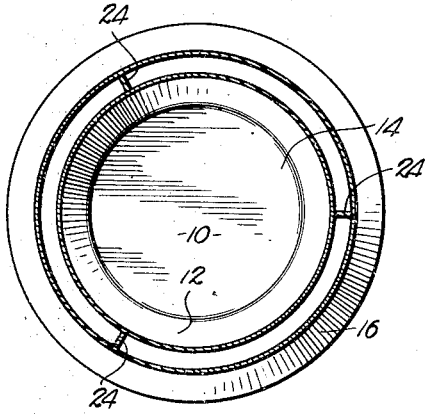
Fig. 4.
INVENTOR.
Leon T. Mart
BY
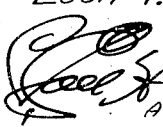
ATTORNEY Patented Jan. 3, 1950

2,493,633

UNITED STATES PATENT OFFICE 2,493,633

DOUBLE-WALLED CONTAINER

Leon T. Mart, Kansas City, Kans.

Application June 3, 1946, Serial No. 673,978

1 Claim. (Cl. 220—97)

This invention relates to double-walled containers of the type customarily employed domestically and to hold either hot or cold liquids when being served as drinks.

The primary aim of my invention is the provision of a double-walled container having the general form and configuration of a drinking cup or receptacle but which has an air space protecting the liquid contained within the receptacle against objectionable temperature changes due to heat exchange resulting from action of the atmosphere upon the external wall of the receptacle.

A further aim of the present invention is to provide a double-walled container of one piece construction; that is economical to manufacture and therefore commercially practical to produce and sell; that has the component parts or walls thereof so disposed as to allow nesting without objectionable interlocking; that provides a layer of insulating air between the receptacle for the liquid and a subscribing skirt for said receptacle; and that will not collect moisture or condensate on its outer face because of a temperature differential between the liquid in the receptacle and the temperature of the surrounding atmosphere.

Other objects of the invention contribute to the utility and novelty of the container when made to embody the preferred form of the invention which is illustrated in the accompanying drawing wherein:

Figure 1 is a central sectional view through a double-walled container made pursuant to this invention.

Fig. 2 is an inverted plan view.

Fig. 3 is a sectional view through a pair of stacked containers, and

Fig. 4 is a cross sectional view taken on line IV—IV of Fig. 1, looking in the direction of the arrows.

The materials from which the container may be molded or otherwise formed are many but, for example, glass, plastic or metal might be used with success. When molded, the container comprises an open top receptacle generally designated by the numeral 10 and having an annular or circumscribing side wall 12 of suitable cross sectional contour and a bottom wall 14. A skirt 16 surrounds the wall 12 of receptacle 10 and joins the upper edge of wall 12 to form an arcuate lip 18 at the zone of interconnection. The length of skirt 16 is greater than the length of receptacle 10 and therefore the bottom wall 14 is held spaced above or inwardly from the base producing edge 20 or skirt 16. It is upon this edge 20 that the entire container rests when in use and placed upon some supporting surface such as a table not here shown.

Skirt 16 is frusto-conical in shape and receptacle 10 is smaller in diameter or cross sectional area at wall 14 than at lip 18. Thus an air space 22 is formed completely around the outer surface of wall 12 of receptacle 10 and said air space communicates with the space between wall 14 and base 20. So creating the major component elements of the unitary container will permit its being stacked as clearly illustrated in Fig. 3. To prevent objectionable interlocking or "sticking" when the containers are in a stacked condition, there is provided a plurality of fins 24, the bottom ends 26 whereof present shoulders against which lip 18 of the underlying container will bear when resting occurs. The position of shoulders 26 is close enough to bottom wall 14 to prevent interengagement between the inner surface of receptacle 10 of one container and the outer surface of receptacle 10 of the container next above. Likewise shoulders 26 preclude interengagement between inner face of skirt 16 of one container and the outer surface of skirt 16 of the container next below. Shoulders 26 formed by fins 24 should be sufficient in number and spaced apart around receptacle 10 to insure that an entering container will not tip to a point of contact with an overlying container. In the instance illustrated, three fins 24 are shown but the number may be increased to suit conditions and the size of the container being produced.

It will be obvious from the foregoing that the presence of the specially formed air space 22 will insulate receptacle 10 from the surrounding atmosphere and that no moisture will collect on the outer surface of skirt 16 when the container is in use. So long as the container is sitting upon a supporting surface to close the normally open bottom of skirt 16, air space 22 will function as an effective insulator for receptacle 10. Thus the temperature of liquid in this receptacle 10 will be maintained constant over a longer period of time than is ordinarily the case with conventional cups or glasses.

Containers having physical characteristics different from those illustrated and described might be made when practicing the invention without departing from the spirit thereof or scope of the appended claim.

Having thus described the invention, what is claimed as new and desired to be secured by Letters Patent is:

A container comprising an open top, frusto-conical, imperforate receptacle having its greatest diameter at said open top; an open bottom, frusto-conical skirt integral with said receptacle at said open top thereof and completely circumscribing the receptacle in spaced relationship thereto, said skirt having its greatest diameter at said open bottom, the height of the receptacle being less than the height of the skirt, and a plurality of substantially triangular-shaped ribs spaced about the periphery of the receptacle within the skirt at the uppermost ends of the receptacle and the skirt, said ribs each being disposed to present a shoulder spaced below said uppermost ends of the receptacle and skirt and spanning the distance between the proximal faces of the receptacle and skirt, said shoulders being in a common plane intersecting and disposed perpendicular to the longitudinal axes of the receptacle and skirt, whereby to hold a plurality of containers against wedging one with another when disposed in stacked relationship with the receptacle of one container nested within the receptacle of a container next below.

LEON T. MART.

REFERENCES CITED

The following references are of record in the file of this patent:

UNITED STATES PATENTS

| Number | Name | Date |
|---|---|---|
| 875,944 | Nash | Jan. 7, 1908 |
| 899,357 | Utigard | Sept. 22, 1908 |
| 1,173,893 | Sutcliffe | Feb. 29, 1916 |
| 1,326,519 | McLaren | Dec. 30, 1919 |
| 1,519,034 | Livingston | Dec. 9, 1924 |
| 1,771,589 | Strauss | July 29, 1930 |
| 1,786,733 | Benoit | Dec. 30, 1930 |
| 1,968,263 | Reuther | July 31, 1934 |
| 1,997,055 | Graefe | Apr. 9, 1935 |
| 2,046,498 | Bell | July 7, 1936 |
| 2,053,949 | Emery | Sept. 8, 1936 |
| 2,057,962 | Mailhoit | Oct. 20, 1936 |
| 2,101,401 | Leppke | Dec. 7, 1937 |
| 2,135,342 | Jackson | Nov. 1, 1938 |
| 2,213,837 | Gill | Sept. 3, 1940 |
| 2,352,684 | Braddock | July 4, 1944 |

FOREIGN PATENTS

| Number | Country | Date |
|---|---|---|
| 14,622 | Austria | Jan. 11, 1904 |